United States Patent [19]

Kubota et al.

[11] Patent Number: 5,369,531
[45] Date of Patent: Nov. 29, 1994

[54] DIGITAL VIDEO SIGNAL RECORDING APPARATUS WITH LEADING AND TRAILING HEADS DISPLACED BY A DISTANCE LESS THAN THE DISTANCE BETWEEN THE ENDING EDGE OF AN AUXILIARY RECORDING AREA AND THE STARTING EDGE OF THE VIDEO SIGNAL RECORDING AREA

[75] Inventors: Yukio Kubota; Yoichirou Senshu, both of Kanagawa, Japan

[73] Assignee: Sony Corporation, Tokyo, Japan

[21] Appl. No.: 937,947

[22] Filed: Sep. 1, 1992

[30] Foreign Application Priority Data

Sep. 13, 1991 [JP] Japan .................. 3-235013

[51] Int. Cl.⁵ .................................. G11B 5/02
[52] U.S. Cl. ...................... 360/18; 360/19.1; 360/21; 358/340
[58] Field of Search .............. 360/19.1, 18, 21, 48, 360/121, 125; 358/335, 340, 341, 343

[56] References Cited

U.S. PATENT DOCUMENTS 4,748,520  5/1988  Odaka .......................... 360/21
5,233,478  8/1993  Kanota ....................... 360/19.1 X Primary Examiner—Andrew L. Sniezek
Attorney, Agent, or Firm—William S. Frommer; Alvin Sinderbrand

[57] ABSTRACT

A digital video tape recorder includes a rotary drum that has a leading head and a trailing head mounted thereon for recording video signals in respective slant tracks scanned on the tape while the tape is advanced. Each of the tracks includes, in sequence in the scanning direction of the respective head, a first auxiliary recording area, a second auxiliary recording area and a video signal recording area. The heads are displaced with respect to each other on the drum in the scanning direction by a distance that is less than the distance in the scanning direction between an ending edge of the first auxiliary recording area of the track formed by the trailing head and a starting edge of the video recording area of the track formed by the leading head. Because of the arrangement of the heads, after-recording of audio signals in the first auxiliary recording area by the trailing head is completed before the leading head begins reproduction of video signals. This prevents cross-talk from the audio recording signal that would disrupt the reproduced video signal. A satisfactory picture can therefore be reproduced during after-recording of audio signals.

7 Claims, 4 Drawing Sheets

DIGITAL VIDEO SIGNAL RECORDING APPARATUS WITH LEADING AND TRAILING HEADS DISPLACED BY A DISTANCE LESS THAN THE DISTANCE BETWEEN THE ENDING EDGE OF AN AUXILIARY RECORDING AREA AND THE STARTING EDGE OF THE VIDEO SIGNAL RECORDING AREA

BACKGROUND OF THE INVENTION

The present invention relates to digital video signal recording apparatus and, more particularly, to a digital video tape recorder (VTR) which is suited for commercial or professional use.

In digital video tape recorders designed for commercial use, video and audio signals are respectively digitized and then recorded in separate areas of a recording track. It is known to operate a digital VTR in a so-called after-recording mode in which an audio signal, for example, is recorded on a recording track on which a video signal has previously been recorded.

It is also known in a digital VTR to perform so-called multi-track recording in which signals are distributed among a plurality of channels for simultaneous recording or reproduction by a plurality of heads. For multi-track recording digital VTRs, it has been proposed to fabricate a plurality of heads together in a single head unit in order to simplify assembly and reduce the number of adjustments required for proper alignment of the heads. However, when after-recording is effected by a digital video tape recorder having a plurality of heads fabricated together in a head unit, the level of the recording signal is very high as compared with that of a reproduced signal so that a video signal reproduced by one head may be disturbed by cross-talk from an audio signal that is simultaneously being after-recorded by another head of the head unit. In this case it may be that a satisfactory reproduced picture cannot be obtained.

FIGS. 1A-1D of the accompanying drawings show tracks A and B which are recorded on, and reproduced from, a tape T by heads a and b, respectively. As shown in FIGS. 1A-1D, on each of the tracks A and B, there are provided a recording area AT1 in which a first tracking adjustment signal is recorded, a first auxiliary recording area AU1 in which a first audio signal is recorded, a second auxiliary recording area AU2 in which a second audio signal is recorded, a recording area VI in which a video signal is recorded, a recording area SC in which a sub code is recorded and a recording area AT2 in which a second tracking adjustment signal is recorded. The respective areas are formed sequentially in the order stated above starting at the beginning of the track and proceeding in the head scanning direction (i.e., from left to right in FIGS. 1A-1D). In order to simplify the drawings, only the respective recording areas of track A are labelled.

The formation of the respective recording areas comes about as a result of the provision of the various types of recording signals to the recording head at times when the head is scanning the respective areas.

FIG. 1A shows the positions of heads a and b relative to the recording areas at a time when leading head a is beginning the after-recording of the first audio signal in recording area AU1 of track A.

Fig. 1B shows the positions of the heads at a time when head a is completing the after-recording of the first audio signal in recording area AU1 of track A.

FIG. 1C shows the positions of the heads when trailing head b is beginning the after-recording of the first audio signal in recording area AU1 of track B.

FIG. 1D shows the positions of the heads when trailing head b is completing the after-recording of the first audio signal in recording area AU1 of track B.

It will be observed that, at the time shown in FIG. 1D, the playback by leading head a of the video signal recorded in recording area VI of the track A has already started. Consequently, cross-talk from the audio signal being recorded by the trailing head b occurs so that the video signal reproduced by head a is disturbed during a period in which head a scans the hatched portion of recording area VI of track A.

To overcome this problem, it has been proposed to mask the reproduced video signal during the period of the disturbance so that the deteriorated portion of the picture is not displayed. According to this previously-proposed method, however, a complete reproduced picture is not provided in the after-recording mode. Furthermore, in digital video tape recorders in which shuffling of video signal data is used, it is frequently observed that a masking of some of the video signal causes deterioration in the entire picture.

In copending U.S. patent application Serial No. 07/852,729, filed Mar. 17, 1992, which has an inventor in common with the present application and which is commonly assigned with this application, the recording areas in each track are arranged so that a video signal recording area precedes audio signal recording areas, and adjacent tracks are offset by a step distance in the head scanning direction. It is proposed in this copending application that a pair of heads be mounted on a head base so that the heads are displaced from each other in the head scanning direction by a distance that is less than the sum of the step distance and the length of a gap between the video recording area and the following audio recording area. The purpose of this arrangement is to prevent disturbance of the video signal during after-recording of an audio signal.

OBJECTS AND SUMMARY OF THE INVENTION

It is an object of the present invention to provide an improved digital video signal recording apparatus in which the earlier described shortcomings of the prior art can be overcome in an apparatus using a tape track format in which audio or other auxiliary signals are recorded in areas in each track that are in advance of the video signal recording area.

More specifically, it is an object of the present invention to provide a digital video signal recording apparatus in which a satisfactory reproduced picture can be obtained in the after-recording mode.

In accordance with an aspect of the present invention, a digital video tape recorder comprises a rotary drum and a plurality of heads mounted on the rotary drum for recording video signals in slant tracks on a magnetic tape while the heads move relative to the tape in a scanning direction to form successive slant tracks on the tape as the tape is advanced. The heads include a leading head and a trailing head that simultaneously scan the tape, the leading head having a leading position in the scanning direction with respect to the trailing head. The leading and trailing heads each form a respective track that includes, in sequence in the scanning direction, a first auxiliary recording area, a second auxiliary recording area and a video signal recording area in which the video signals are recorded. The heads are mounted on the rotary drum so that the leading and trailing heads are displaced with respect to each other in the scanning direction by a distance that is less than the distance in the scanning direction between the ending edge of the first auxiliary recording area of the track formed by the trailing head and the starting edge of the video recording area of the track formed by the leading head.

With the arrangement of heads in the digital video tape recorder as described above, reproduction of the video signal by the leading head begins after recording of the audio signal by the trailing head in the first auxiliary recording area is complete. Therefore, the audio recording signal, which has a high level, is not present at the same time as the reproduced video signal, so that a satisfactory video signal can be obtained in the after-recording mode.

The above, and other objects, features and advantages of the present invention will be apparent from the following detailed description thereof to be read in conjunction with the accompanying drawings, in which like reference numerals are used to identify the same or similar parts in the several views.

DETAILED DESCRIPTION OF THE PREFERRED EMBODIMENTS

Figure 1A:
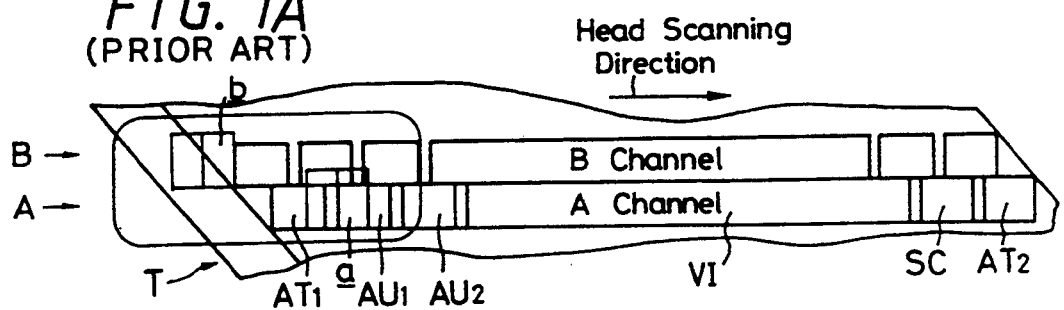
FIGS. 1A–1D are diagrams showing spatial relationships of heads and recording areas of tape tracks during successive stages of an after-recording operation of a digital VTR according to the prior art.
Figure 1B:
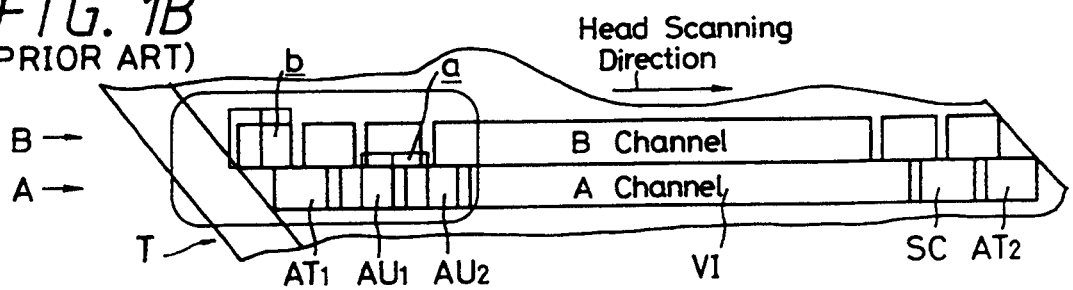
Figure 1C:
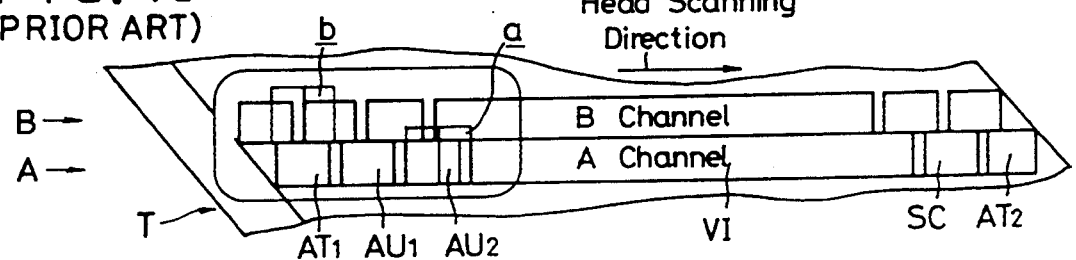
Figure 1D:
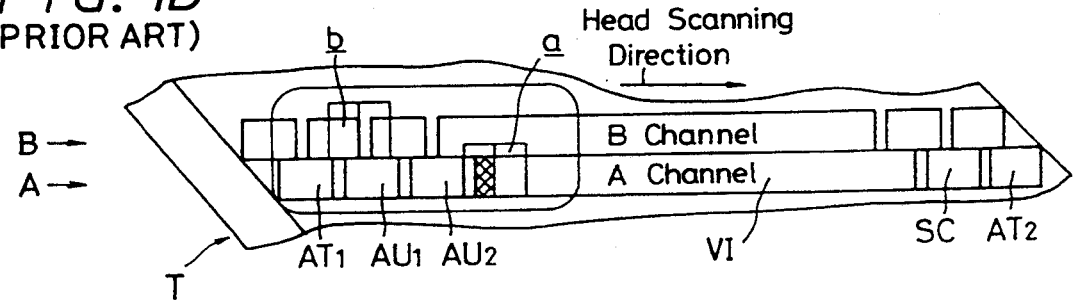

The present invention will now be described with reference to FIGS. 2A–2E and FIGS. 3A–3C, in which like parts corresponding to those of FIG. 1 are marked with the same reference characters and therefore need not be described in detail.

As shown in FIGS. 2A–2D, tracks A and B are respectively recorded on, and reproduced from, a tape T by heads a and b. Tracks A and B are displaced with respect to each other in a transverse direction perpendicular to the head scanning direction by a pitch distance P. Heads a and b are mounted together on a rotary head drum (not shown in FIGS. 2A–2D) with head a being in a leading position in the head scanning direction with respect to head b. It will be understood that head a may therefore be considered a leading head and head b a trailing head. Heads a and b are displaced with respect to each other in the transverse direction (i.e. the direction perpendicular to the head scanning direction) by a distance that is substantially equal to the track pitch P.

On each of the tracks A and B, there are respectively provided a recording area AT1 in which a first tracking adjustment signal is recorded, a first auxiliary recording area AU1 in which a first audio signal is recorded, a second auxiliary recording area AU2 in which a second audio signal is recorded, a recording area VI in which a video signal is recorded, a sub code recording area SC in which a sub code is recorded and a recording area AT2 in which a second tracking adjustment signal is recorded. The respective areas are formed sequentially in the order stated above starting at the beginning of the track and proceeding in the head scanning direction (from left to right in FIGS. 2A–2D). Respective guard areas AG are provided between recording areas AT1 and AU1, between recording areas AU1 and AU2, and between recording areas AU2 and VI. In order to simplify the drawings, only the respective recording areas of track A are labelled, and only the guard areas of track A shown in FIG. 2B are labelled.

According to the present invention, heads a and b are mounted so that there is a specified distance or length GL, in the head scanning direction, between the respective gaps g (labelled only in FIG. 2A) of the heads a and b. Distance GL is selected to be shorter than a distance or length K in the head scanning direction between the ending edge e of the recording area AU1 of track B recorded and reproduced by the trailing head b and the starting edge s of the recording area VI of recording track A recorded and reproduced by the leading head a. The length K is defined by the sum of a length $l_1$ of the recording area AU2, lengths $l_2$, $l_3$ of guard areas provided before and after the recording area AU2 and an offset distance $l_4$ between the tracks A and B determined by respective synchronizing signals. For a given length K, the length GL is determined in accordance with the following equation:

$$GL < K = l_1 + l_2 + l_3 + l_4$$

Figure 2A:
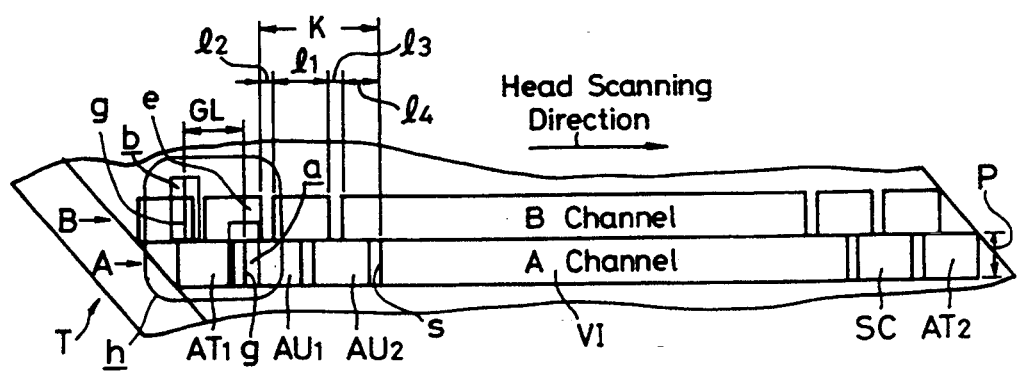
FIGS. 2A–2D are diagrams showing spatial relationships of heads and recording areas of tape tracks during successive stages of an after-recording operation of a digital video tape recorder according to the present invention.
Figure 2B:
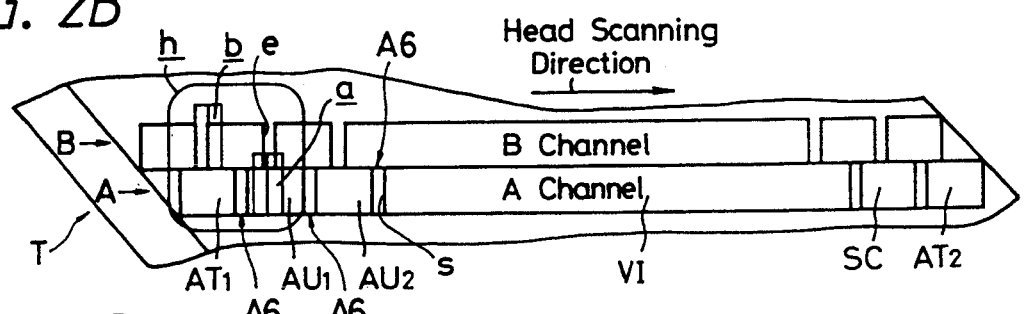

FIG. 2A shows the positions of heads a and b relative to the recording areas at a time when leading head a is beginning the after-recording of the first audio signal in recording area AU1 of track A.

FIG. 2B shows the positions of the heads at a time when trailing head b is beginning the after-recording of the first audio signal in recording area AU1 of track B.

Figure 2C:
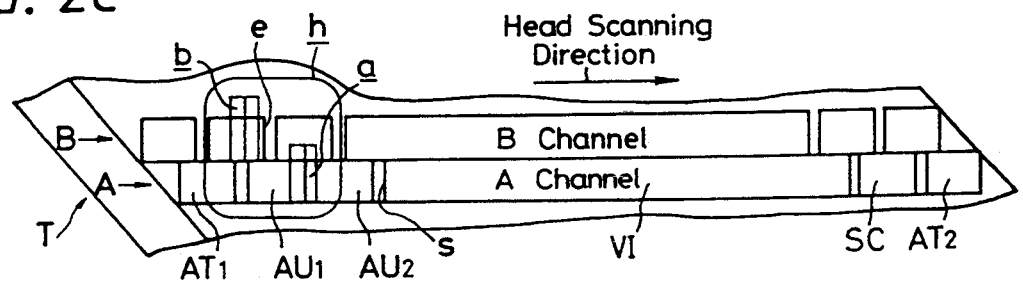

FIG. 2C shows the positions of the heads at a time when leading head a is completing the after-recording of the first audio signal in recording area AU1 of track A.

Figure 2D:
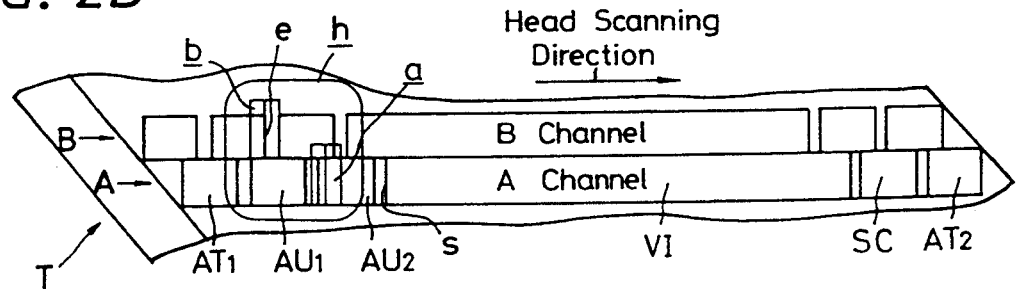

FIG. 2D shows the positions of the heads at a time when trailing head b is completing the after-recording of the first audio signal in recording area AU1 of track B.

It will be noted that reproduction of the video signal by the leading head a from recording area VI of track A has not yet begun at the time shown in FIG. 2D, so that there will be no cross-talk from the audio signal recorded by the trailing head b in recording area AU1 of track B when leading head a reproduces the video signal from recording area VI of track A. In other words, in accordance with the invention, after-recording of the audio signal by the trailing head is completed before the leading head begins reproducing the video signal previously recorded in the track scanned by the leading head. In this way, the strong audio recording signal is not present in the trailing head at the same time that the leading head is reproducing the video signal, so that a satisfactory picture can be reproduced in the after-recording mode of operation.

The length GL between the heads a and b typically cannot be made less than about 450 μm because of restrictions from the standpoint of head assembly. This length GL is sufficient, however, because the length $l_1$ of recording area AU2 is about 500 μm so that length K exceeds 500 μm.

Figure 2E:
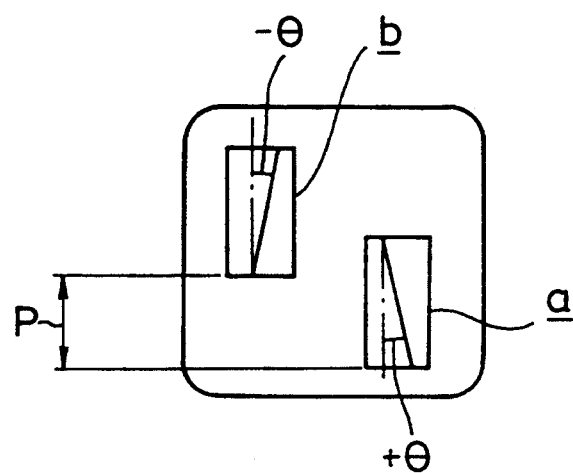
FIG. 2E is a schematic illustration of the azimuth angles of recording heads in a digital VTR according to the present invention.

Further, although azimuth angles of the two heads a and b are shown to be the same in FIGS. 2A-2D for simplicity, the heads usually have different azimuth angles in order to permit high density recording while avoiding cross-talk during playback. This is illustrated in FIG. 2E in which head a has an azimuth angle $+\theta$ while head b has an azimuth angle of $-\theta$.

Figure 3A:
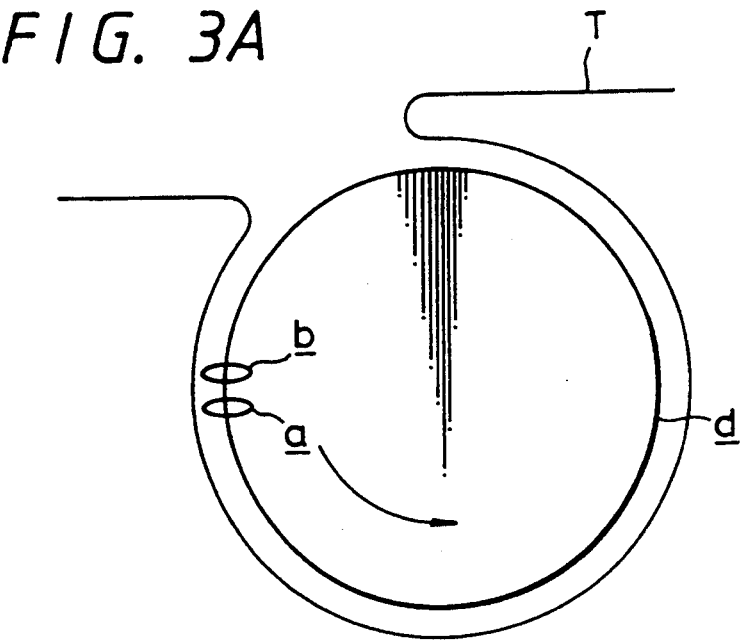
FIGS. 3A–3C are schematic illustrations of head mounting configurations of respective embodiments of the present invention.
Figure 3B:
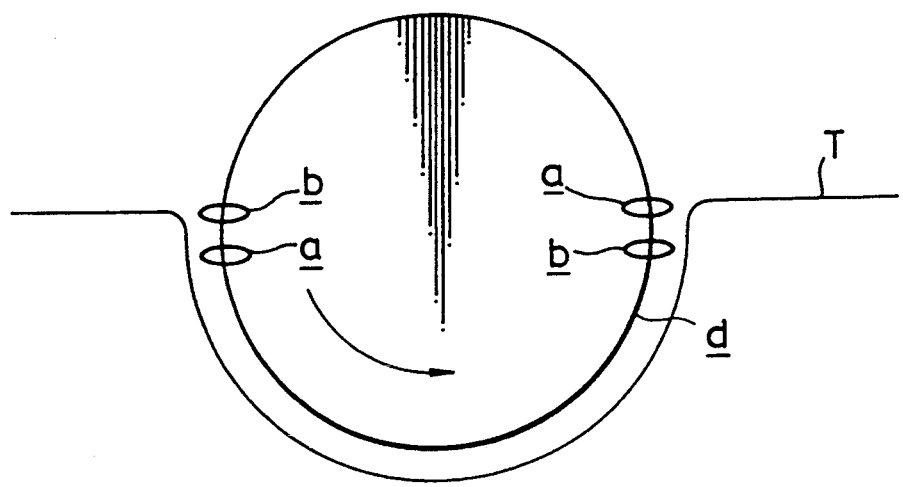
Figure 3C:
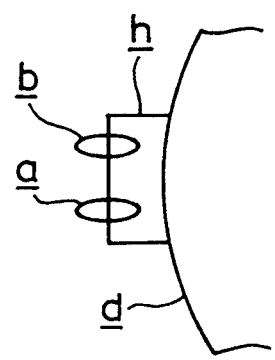

As shown in FIGS. 3A and 3B, tape T is helically wrapped in a known manner around drum d and tape T is advanced with respect to drum d by known tape transport means (not shown) so that the oblique tracks A and B shown in FIGS. 2A-2D are formed by heads a and b. Although a single set of heads a and b may be mounted on a rotary head drum d as shown in FIG. 3A, the present invention is not limited thereto and may be applied to the case in which two sets of heads a and b are mounted at diametrically opposed locations on the rotary head drum d as shown in FIG. 3B. In the latter case, an angle through which a magnetic tape T is wrapped around the rotary head drum d should be substantially equal to 180°. FIG. 3C illustrates an embodiment of the invention in which heads a and b are fabricated together in a single head base or unit h which is mounted on the rotary drum d.

It should be noted that, in the digital video tape recorder as described above, the audio or other signal recorded in the second auxiliary recording area AU2 of track A cannot be reproduced during the after-recording of recording area AU1 of track B. However, the distance between the ending edge of recording area AU2 of track B and recording area VI of track A (i.e., the sum of lengths $l_3$ and $l_4$) is not much shorter than the distance GL between heads a and b, so that after-recording of the recording area AU2 of track B can be effected if a very small amount of deterioration of the reproduced picture or video signal is permitted.

Although in the embodiments illustrated herein sets of two heads are shown, the invention is not so limited. Each set of heads may include more than two heads, i.e. three or more. In such a case, it should also be understood that the leading and trailing heads need not be adjacent.

Having described specific preferred embodiments of the invention with reference to the accompanying drawings, it is to be understood that the invention is not limited to that precise embodiment and that various changes and modifications may be effected therein by one skilled in the art without departing from the spirit or scope of the invention as defined in the appended claims.

What is claimed is:

1. A digital video tape recorder comprising:

a rotary drum; and a plurality of magnetic heads mounted on said rotary drum for recording video signals on a magnetic tape, said heads moving relative to said tape in a scanning direction to form successive slant tracks thereon while the tape is advanced, said heads comprising a leading head and a trailing head that simultaneously scan said tape, said leading head having a leading position in said scanning direction with respect to said trailing head, said leading and trailing heads each forming a respective track that includes, in sequence in said scanning direction, a first auxiliary recording area, a second auxiliary recording area and a video signal recording area in which said video signals are recorded; said heads being mounted on said rotary drum so that a given point of said leading head is displaced with respect to the same given point of said trailing head in said scanning direction by a distance that is less than a distance in said scanning direction between an ending edge of said first auxiliary recording area of said track formed by said trailing head and a starting edge of said video recording area of said track formed by said leading head so that when said leading and trailing heads scan the tape said heads do not reach similar recording areas simultaneously.

2. A digital video tape recorder as in claim 1; wherein said recorder is operable in an after-recording mode in which an audio signal is recorded in said first auxiliary recording area.

3. A digital video tape recorder as in claim 2; wherein an audio signal is recorded in said second auxiliary recording area during operation of said recorder in said after-recording mode.

4. A digital video tape recorder as in claim 3; wherein guard areas are provided in each said track between said first and second auxiliary recording areas and between said second auxiliary recording area and said video signal recording area.

5. A digital video tape recorder as in claim 1; wherein adjacent ones of said successive slant tracks are displaced with respect to each other in a transverse direction perpendicular to the scanning direction by a pitch distance and wherein said heads are mounted on said rotary drum so that said leading and trailing heads are displaced with respect to each other in said transverse direction by a distance that is substantially equal to said pitch distance.

6. A digital video tape recorder as in claim 5; wherein said leading and trailing heads have different azimuth angles.

7. A digital video tape recorder as in claim 6, wherein said leading and trailing heads are fabricated together in a single unit that is mounted on said rotary drum.

* * * * *